Aug. 15, 1961     F. J. FONTEIN     2,996,182
PROCESS AND APPARATUS FOR WET SCREENING
Filed April 18, 1958     2 Sheets-Sheet 1
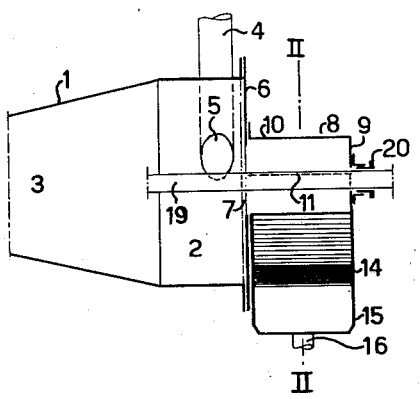
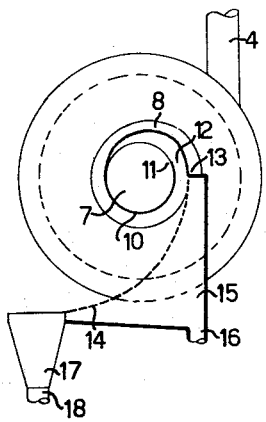
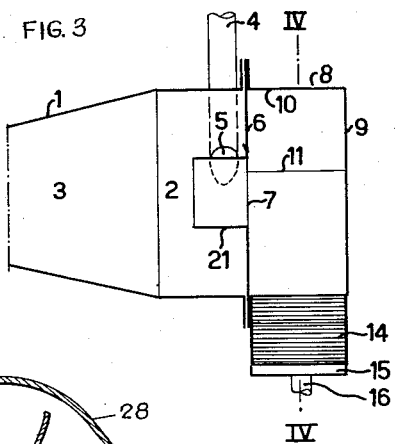
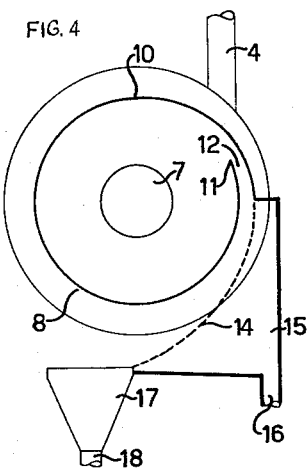
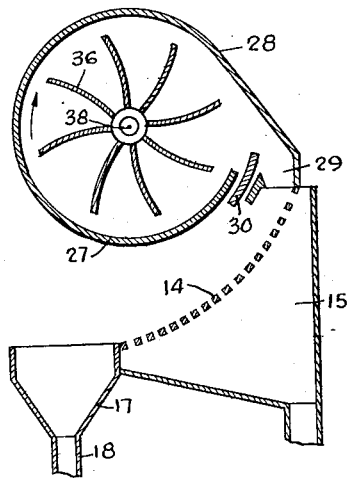
Inventor
Freerk J. Fontein
By Cushman, Darby & Cushman
Attorneys Aug. 15, 1961  F. J. FONTEIN  2,996,182
PROCESS AND APPARATUS FOR WET SCREENING
Filed April 18, 1958  2 Sheets-Sheet 2
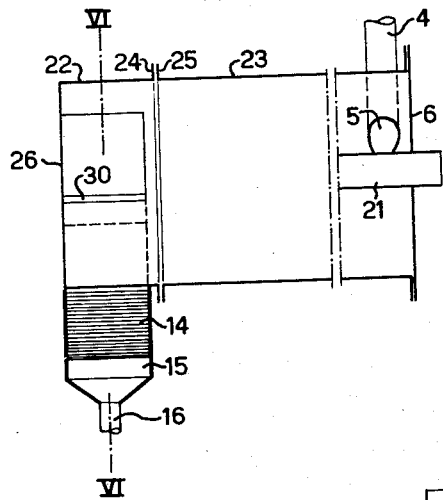
FIG. 5.
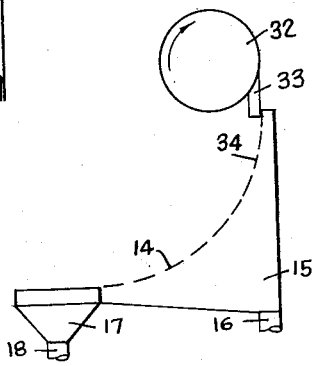
FIG. 7.
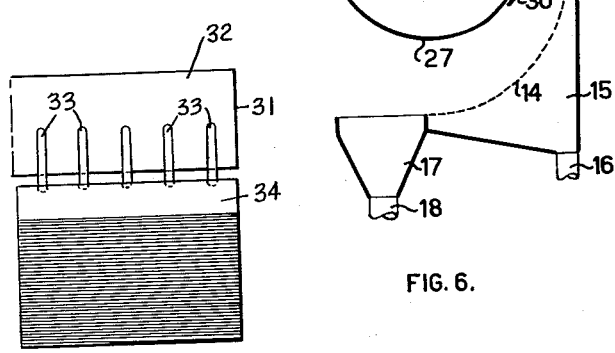
FIG. 6.
FIG. 8.
Inventor
Freerk J. Fontein
By Cushman, Darby & Cushman
Attorneys

United States Patent Office 2,996,182
Patented Aug. 15, 1961

2,996,182
PROCESS AND APPARATUS FOR
WET SCREENING
Freerk J. Fontein, 7 Buitenweg, Heerlen, Netherlands, assignor to Stamicarbon N.V., Heerlen, Netherlands
Filed Apr. 18, 1958, Ser. No. 729,376
Claims priority, application Netherlands Apr. 18, 1957
12 Claims. (Cl. 209—12)

The present invention relates to particle separation and more particularly to a process and an apparatus for supplying liquid-suspended solid particles to a sieve bend.

In general, a sieve bend comprises a separating body or screening deck provided with openings, which in the direction of the flow of the material are narrower than or at most as wide as they are in the direction perpendicular to said flow. The liquid suspended material is supplied towards the screening deck and parallel to the elongation of the feed end of this deck. Thus, with a curved screening deck the material is fed tangentially onto the concave side of the screening deck, in a direction perpendicular to the generatrices.

It is known that for obtaining a good screening effect with a sieve bend the material to be screened should be supplied to the feed end as a layer and at a certain minimum rate. The feed rate is dependent, in part, on the nature of the suspension to be screened and on the particle size at which the cut is to be made. Often a height of fall of 50 cm. or more will be used to obtain the required initial speed. To this end, use may be made of a feed tank with an overflow partition the upper edge of which is, say, 50 cm. over the feed end of the screening deck. If the desired feed rate is high, a higher feeding deck. If the desired feed rate is high, a higher feed drop will have to be used or the suspension will have to be forced through a feed slot by means of a pump.

It is an object of the present invention to provide a process and an apparatus in which the use of a feed tank as mentioned above or of a higher feed drop is not necessary, so that the total height of the construction can be reduced.

Another object of the present invention is the provision of a method of the type described in which part of a body suspension rotating around an axis parallel to the generatrices of a screening deck, which part is formed at or in the elongation of the feed side of a sieve bend and the length of which is substantially equal to the effective width of the sieve bend, or an outer layer of such length peeled off from this body, is fed, as a layer or in the form of a plurality of suspension jets, tangentially to the concave side of the screening deck, in a direction perpendicular to the generatrices of this deck and substantially tangential to the said body, at a velocity at least equalling the tangential velocity of said part or of said outer layer. With a so-called straight sieve bend, which may be regarded as a curved sieve bend with an infinite radius, the peeled off layer is thus supplied to the sieve bend in a direction parallel to the screening deck.

Still another object of the present invention is the provision of a method of the type described in which the rotating body comprises one of the vortices formed in a hydrocyclone when a liquid mixed with solid particles is fed to the hydrocyclone tangentially and under pressure.

It is known that hydrocyclones are widely used for classifying or washing solid particles, which particles are for this purpose suspended in a liquid and fed tangentially and under pressure to the inner wall of the hydrocyclone, in such a way that two concentric vortices are created and the particles are separated either according to size or to specific gravity. The inner vortex leaves the hydrocyclone through the central aperture in the base, taking along the smaller particles or the particles of lower specific gravity, and the outer vortex leaves the hydrocyclone through the central discharge aperture at the opposite end, taking along the larger particles or the particles of higher specific gravity. If it is desired to separate the liquid from the solid particles contained in either one or both of the fractions obtained in the hydrocyclone, or to separate off the finest particles contained in either one or both of the fractions, these fractions should be subjected to a further screening treatment. The vortices created in the hydrocyclone still possess a large amount of kinetic energy, which, by the application of the process and apparatus according to the present invention, can be utilized for obtaining the feed velocity required for the operation of the sieve bend. Heretofore, the fractions have always been collected in funnels or troughs and then sent to the feed tank of the sieve bend, so that the kinetic energy was lost.

Accordingly, it is a further object of the present invention to provide an apparatus capable of utilizing the kinetic energy of discharge of a hydrocyclone as the feed energy for a sieve bend.

These and other objects of the present invention will become more apparent during the course of the following detailed description and appended claims.

The invention can best be understood with reference to the accompanying drawings wherein illustrative embodiments are shown.

In the drawings:

FIGURE 1 is a vertical longitudinal sectional view of part of a hydrocyclone and a sieve bend having a feed device, embodying the principles of the present invention, operatively thereto;

FIGURE 2 is a cross sectional view taken along the line II—II of FIGURE 1;

FIGURE 3 is a vertical sectional view similar to FIGURE 1 showing a modified form of feed device embodying the principles of the present invention;

FIGURE 4 is a cross-sectional view taken along the line IV—IV in FIGURE 3;

FIGURE 5 is a vertical sectional view of a cylindrical hydrocyclone having a sieve bend connected thereto in accordance with the principles of the present invention;

FIGURE 6 is a cross-sectional view taken along the line VI—VI in FIGURE 5;

FIGURE 7 is a cross-sectional view of a chamber, embodying the principles of the present invention, with a sieve bend connected to it;

FIGURE 8 is a fragmentary rear view of the chamber and the sieve bend shown in FIGURE 7 with the collecting tanks for the separated fractions removed; and FIGURE 9 is a cross-sectional view of still another embodiment of the present invention.

Referring now more particularly to the drawings, there is shown in FIGURES 1 and 2 a hydrocyclone 1 which comprises a cylindrical portion 2 and a conical portion 3 rigidly interconnected in axial alignment. Tangentially secured to the cylindrical portion 2 is a feed pipe 4, opening into the hydrocyclone, as at 5. The cylindrical portion 2 is closed by a cover 6 having a central opening 7 for the passage of the fraction of smaller particles or particles of lower sp. gr. separated off in the hydrocyclone and contained in the inner vortex created in the operation of the hydrocyclone.

On the cover 6, there is a chamber 8 in the shape of a volute which is bounded at one end by a wall 9 normal to the axis of the hydrocyclone. The volute is formed by a substantially cylindrical wall 10, having generatrices parallel to the axis of the hydrocyclone 1 and one end portion, indicated at 11, which coincides with the circumference of the opening 7. As best shown in FIGURE 2, the wall 10 coincides with part of the circumference of the opening 7, then leaves it so that the distance from the wall to the axis of the hydrocyclone gradually becomes greater and a slot-like opening 12 is formed between that part of the wall 10 which is closest to the axis and the part farthest from the axis. Preferably, these two parts overlap for a short distance as shown in FIGURE 2.

Tangentially joined to the end 13 of the wall 10 is a sieve bend 14. It will be understood, however, that it is also possible to have the sieve bend 14 tangentially joined to the inner side of the wall 10. The sieve bend 14 is further provided with a collecting tank 15 for the undersize fraction of the screen, which tank has a discharge tube 16, and with a collecting tank 17 for the overflow fraction, having a discharge pipe 18.

A central pipe 19 extends into the hydrocyclone through the cover 9 and is sealed in liquid-tight engagement with the cover by means of a nipple 20 with internal and external screw threads, so that the air core forming in the hydrocyclone can be connected to a space outside the same.

In operation, a suspension of solid particles in a liquid is forced into the hydrocyclone through the feed pipe 4 and opening 5 which creates two concentric vortices therein. In the outer vortex, mainly the larger particles or the particles of higher sp. gr. are collected in dependence on the design of the hydrocyclone, the nature of the liquid, etc. These particles leave the hydrocyclone through a central aperture in the apex of the cone (not shown). In the inner vortex, the smaller particles, or the particles of lower sp. gr. are collected. This vortex leaves the hydrocyclone through the opening 7 and flows into the volute chamber 8. From the body of liquid and solid particles rotating in this chamber, a layer is peeled off by the inner and outer walls which form the slot 12. This peeled off layer then flows tangentially onto the deck of the sieve bend 14. The initial velocity of this layer when it reaches the sieve bend depends on the rotational velocity of the rotating body of material and on the distance from the wall of the volute to the axis of the hydrocyclone. As the rotational velocity may be very high, depending on the dimensions of the hydrocyclone and the amounts of suspension fed into the cyclone to be classified or washed, the velocity of the suspension when fed to the sieve bend may also be high. The thickness of the layer to be fed to the sieve bend depends on the slot width 12. If desired, this thickness may be controlled by means of a curved plate 30 which can be shifted along the outer wall 10, as is shown, for example, in FIGURES 5 and 6. Moreover, a volute similar to that mentioned above may be provided at the conical end of the hydrocyclone. Preferably, the passage of the slot is made so large that no back pressure can build up, by which the operation of the hydrocyclone might be influenced.

In addition to the tangential or angular velocity of the rotating body of liquid, there is also present an axial velocity. It is possible to place vanes along the inner side of the wall 10, which convert the axial velocity into a tangential velocity. These vanes are not shown in the drawing. They may cause the formation of a back-pressure in the hydrocyclone and thus adversely influence the operation of the hydrocyclone. Further, they are liable to heavy wear if the material to be separated has abrasive qualities. Under certain conditions it will therefore be preferred to use a chamber having a diameter greater than that of the corresponding outlet of hydrocyclone, as is shown e.g. in FIGURES 3 and 4.

In FIGURES 3 and 4, the parts corresponding to those shown in FIGURES 1 and 2 are indicated by the same reference numbers. As appears from the drawing, the chamber 8 here has a much greater internal diameter than the opening 7 in wall 6. A cylindrical or conical vortex finder 21 extends into the cylindrical portion 2. In the chamber 8, a rotating body of liquid and solid particles is formed, which, along the wall 10, has substantially a tangential velocity component. The internal diameter of the chamber 8 is chosen in dependence on the rotational velocity at which the suspension flows through the opening 7, and on the diameter of this opening, the choice being guided by the initial velocity which the peeled-off layer is to have when it reaches the feed end of the sieve bend. Also in this case, it is possible to control the thickness of the layer supplied to the sieve bend by varying the width of the slot. Similarly, the central overflow discharge aperture of the hydrocyclone may open into a chamber which has a larger internal diameter than the apex discharge aperture of the hydrocyclone.

In the embodiment shown in FIGURES 5 and 6, a chamber 22, similar to the chamber 8 previously described, is located at the end of the cylindrical wall of a cylindrical hydrocyclone 23 or forms an elongation thereto. The chamber 22 is fastened to an annular end flange 25 of the hydrocyclone 23 by means of a corresponding flange 24. The chamber is closed at the bottom by a transverse wall 26. The wall of the chamber, which is parallel to the axis of the hydrocyclone, has a substantially cylindrical part 27 with a diameter equal to that of the hydrocyclone and a wall 28 extending tangentially therefrom. Extending from the outer end of the wall 28 is a mouth 29 of substantially rectangular cross section. The thickness of the layer to be peeled off can be controlled by means of a curved plate 30 which can slide along the wall 27. If necessary, liquid-tight seals may be placed between the plate 30 and the wall 27 or the mouth 29. The sieve bend 14 is tangentially joined to the mouth 29. The chamber 22 need not necessarily have the shape shown in FIGURE 6. The curved wall 27—28 may have a gradually increasing radius, in which case care is to be taken to ensure a gradual transition from the cylindrical part of the hydrocyclone to the chamber.

In the embodiment according to FIGURES 7 and 8, the chamber consists of a cylinder 32 closed by a transverse wall 31, into which cylinder open a number of tangentially-disposed pipes 33, situated beside each other in the axial sense and evenly spaced over the width of the screen deck 14, the arrangement as to the direction of the pipes being determined by the vortex to be formed in the chamber 32. The pipes 33, which may be short, open tangentially onto a plate 34, which forms an elongation to the screen deck 14 and whose dimension in the direction of flow of the material is so chosen that the separate jets of suspension which leave the pipes 33 and may have a circular cross section will unite to form a layer of uniform thickness before they reach the screen deck 14.

The invention is not restricted to the embodiments shown. For instance, the shape of the chamber may be altered without departing from the invention.

Although in principle they are not destined for the function, the control slides for varying the slot width may also be used for altering the particle size of separation or the specific gravity of separation of the hydrocyclone. The sieve bend may be placed at one of the discharge apertures of the hydrocyclone or a sieve bend may be placed at each of the two discharge apertures. In the end wall 9 of the embodiment shown in FIGURES 3 and 4 a tube 19 similar to that shown in FIGURES 1 and 2, may be provided.

The invention is not restricted either to the use of a sieve bend in combination with a hydrocyclone. It may also be used in those cases where a suspension to be screened is aspirated from a greater depth. By imparting to the suspension aspirated upwards a rotary motion by means of guide vanes or a rotary element, it is possible, without the use of a feed tank for the sieve bend, directly to peel off a layer from the liquid and feed it at a high initial velocity to the feed end of the sieve bend.

Referring now to FIGURE 9, such an arrangement is shown wherein vanes 36 form a part of a rotary pump impeller 38 which is mounted within the cylinder part 27. As is apparent, the plate 30 operates in a manner generally similar to the arrangement in FIGURE 6, the rotary motion to the material being imparted by the rotary pump impeller 38 wherein a layer is peeled off by the desired positioning of the plate 30.

It can thus be seen that there has been provided an apparatus including a chamber closed at one end by a transverse wall and having a substantially cylindrical wall whose generatrices are parallel to those of a sieve bend, the chamber having a length equal to the effective width of the sieve bend and being provided with one or more discharge devices which are joined to the curved wall tangentially and in the direction in which the suspension rotates, the whole arrangement being such that, if there is one discharge device this has a length substantially equal to the effective width of the sieve bend, and, if there are several, these devices are arranged beside each other in the axial sense and evenly spaced over the effective width, such discharge device or devices being tangentially joined to the concave side of the sieve bend and being perpendicular to the generatrices of this sieve bend.

According to one embodiment of the invention the chamber has the shape of a volute and the outer wall of this volute overlaps the adjoining inner wall for some distance. In this way, the occurrence of turbulence in the outflowing jet is prevented as much as possible.

In a preferred embodiment the volute is placed co-axial with one or both discharge ends of a hydrocyclone. It is possible to join the volute direct to the discharge aperture, so that the smallest distance from the wall of the volute to the axis of the hydrocyclone is equal to the radius of this discharge aperture. The axial velocity of the vortext of suspension leaving the hydrocyclone must be taken care of. This axial velocity can be converted into a tangential velocity by providing guide vanes in the wall of the volute. However, such vanes may have an adverse effect on the operation of the hydrocyclone, and are moreover liable to heavy wear.

It is already known to have one or both discharge apertures of a hydrocyclone open into a chamber having a wider diameter than the discharge apertures.

According to the invention this chamber may have the shape of a volute. This embodiment of the invention presents the advantage that no axial current—or a negligible one—occurs in the slot-like aperture. In general the flow profile of the slot will be so chosen as to ensure that the vortex leaving the hydrocyclone reaches the sieve bend as a layer of uniform thickness. Instead of discharging the rotating layer or its outer peel through a slot, a number of discharge tubes, placed beside each other, in an axial direction, may be provided which discharge tangentially to the outer wall of the chamber in a direction perpendicular to the generatrices of the sieve bend, such discharge tubes being spaced evenly over the width of the screen. In this way, the axial velocity components of the liquid flowing onto the screen deck can be eliminated. It is further contemplated that tubes having diameters larger than the width of the slot can be utilized, so that there is less danger of big particles blocking the feed to the sieve bend.

If there is danger of the air core in the hydrocyclone adversely influencing the formation of the layer of suspension issuing from the volute, the wall of the volute normal to the axis is provided with means, placed concentrical with the hydrocyclone, for connecting the air core in the hydrocyclone with a space outside the hydrocyclone, for example a central tube passing through the end wall and reaching at least into the air core.

The apparatus according to the invention can also be used in combination with a cylindrical hydrocyclone. In this case, the chamber to which the sieve bend for screening the discharge fraction is connected forms that end of the cylindrical hydrocyclone which is farthest from the inlet or is connected to this end as a lengthening piece.

Due to the rotary movement of the liquid body in the hydrocyclone, a rotating body of solid particles is formed along the wall of the hydrocyclone such that the largest or heaviest particles are travelling close to the wall and smaller or lighter particles are more or less spaced apart from the wall. By adjusting the slot-shaped aperture formed in the wall of the hydrocyclone by means of a sliding plate 30 it will be possible to regulate not only the capacity of the feed to the sieve bend but also the gradation in size or specific weight of the solid particles in the feed of the sieve bend and consequently the density of the feed.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In an apparatus of the type described, the combination comprising: a sieve bend including a separating body having a feed end, a discharge end, and a separating surface extending therebetween which generally conforms to a surface generated by moving a horizontal line parallel to itself; means defining a chamber adjacent the feed end of said separating body for containing a rotating body of suspension to be fed to said screening deck, said chamber having a curved peripheral wall whose generatrices are substantially parallel to the generatrix line of said separating body, at least one closed end, and a length at least equal to the effective width of said separating body; and means extending substantially tangentially from the outer periphery of said chamber in the direction of suspension body rotation therein to the feed end of said separating body for directing an outer portion of the rotating suspension body in said chamber onto the feed end of said separating body in a direction substantially perpendicular to the generatrix line thereof so that it is received on said separating body in layer formation throughout the width thereof.

2. The combination as defined in claim 1 including a rotary pump impeller operatively mounted in said chamber for imparting rotation to the body of suspension.

3. The combination as defined in claim 1 wherein said peripheral chamber wall is at least in part in the shape of a circular cylinder.

4. The combination as defined in claim 1 wherein said peripheral chamber wall is at least in part in the shape of a volute.

5. The combination as defined in claim 1 wherein said portion directing means comprises spaced overlapping end portions of said peripheral wall defining a chamber discharge slot therebetween extending throughout the length of said chamber.

6. The combination as defined in claim 5 wherein a plate is mounted adjacent one end portion of said peripheral wall for movement into different positions of adjustment to vary the size of said discharge slot.

7. In an apparatus of the type described, the combination comprising: a hydrocyclone including a hollow body of radially symmetrical interior configuration about a zontal axis of symmetry arranged to have a suspension of solid particles and liquid fed substantially tangentially thereto so as to create inner and outer suspension vortices in said hollow body; a sieve bend including a separating body having a feed end and a separating surface defined by moving a horizontal generatrix line parallel to the axis of said hollow body; and means for directing at least an outer portion of one of the suspension vortices discharging from said hydrocyclone substantially tangentially from its axis of rotation onto the feed end of said sieve bend separating body in a direction perpendicular to generatrix line thereof so that it is received on the separating body in layer formation throughout the width thereof.

8. The combination as defined in claim 7 wherein said portion directing means includes a chamber having a peripheral wall substantially coaxial with said hollow body.

9. The combination as defined in claim 8 wherein the interior configuration of said hollow body is cylindrical and wherein said peripheral wall includes a cylindrical portion of equal radius mounted in longitudinal alignment with said hollow body adjacent an end thereof remote from the position of tangential feed.

10. The combination as defined in claim 7 wherein said hollow body includes an axial opening adjacent one end thereof for discharging the inner suspension vortex, and wherein said portion directing means includes a chamber for receiving the discharging inner suspension vortex, said chamber including a peripheral wall substantially coaxial with said opening.

11. The combination as defined in claim 10 wherein the smallest radial dimension of said peripheral wall is substantially equal to the radius of said discharge opening.

12. The combination as defined in claim 10 wherein the smallest radial dimension of said peripheral wall is substantially equal to the largest radial dimension of said hollow body.

References Cited in the file of this patent

UNITED STATES PATENTS

| | | |
|---|---|---|
| 1,135,304 | Liggett et al. | Apr. 13, 1915 |
| 1,685,512 | Varusky | Sept. 25, 1928 |
| 2,569,141 | Bakels | Sept. 25, 1951 |
| 2,717,695 | Martin | Sept. 13, 1955 |
| 2,833,413 | Fontein | May 6, 1958 |
| 2,835,387 | Fontein | May 20, 1958 |
| 2,855,099 | De Koning | Oct. 7, 1958 |
| 2,860,782 | Fontein | Nov. 18, 1958 |

FOREIGN PATENTS

| | | |
|---|---|---|
| 1,072,467 | France | Mar. 17, 1954 |